Patented May 20, 1930

1,759,261

UNITED STATES PATENT OFFICE

GEORG KALISCHER, OF FRANKFORT-ON-THE-MAIN, AND HEINRICH RITTER, OF DIETESHEIM-ON-THE-MAIN, GERMANY, ASSIGNORS TO GENERAL ANILINE WORKS, INC., OF NEW YORK, N. Y., A CORPORATION OF DELAWARE

PROCESS FOR MANUFACTURING SULPHUR DYESTUFFS

No Drawing. Application filed June 26, 1928, Serial No. 288,529, and in Germany July 11, 1927.

Our invention relates to a new and advantageous improvement in the process for producing sulphur dyestuffs which improvement consists in using hydroaromatic hydroxy-compounds as solvents in the heating process with polysulfides. Suitable solvents of this kind are for instance cyclohexanol and its homologues, tetralol, decalol and similar compounds.

It is a surprising fact that polysulfides are easily soluble in hydroaromatic hydroxy-compounds without affecting them, so that the latter can be nearly completely recovered from the reaction mass without being dehydrogenated.

The especial technical effect of our improved process consists in carrying out the sulphurization process in a homogeneous melt at relatively high temperatures. The success of the reaction is favorably influenced by the further fact that the components to be sulphurized at the elevated temperatures applied are mostly easily soluble in the solvents used and that therefore their reactivity towards polysulfides is essentially increased. Owing to these facts according to our improved process the sulphurization is effected in a substantially shorter time than it was hitherto possible. As a consequence of this reduction of time very pure and very soluble dyestuffs are produced in an excellent yield without the formation of less soluble by-products which are generally formed by a too high extension of sulphurization when sulphurizing for a longer time in the hitherto usual manner.

Our improved process is particularly suitable for the production of the important class of sulphur dyestuffs derived from indophenols and their leucocompounds it being of special technical importance to produce this class of sulphur dye-stuffs in a really pure state.

When carrying out our process practically the reaction mass is worked up in the usual manner. The solvent may be recovered by steam distillation or distillation in vacuo and the inorganic salts may be removed from the remaining residue as usually. In many cases when the dyestuffs directly separate from the fusion mass, the dyestuffs may be isolated by direct filtration and the solvent may be directly used for further fusion operations.

In order to further illustrate our invention the following examples are given, the parts being by weight and all temperatures in centigrade degrees. We wish it however to be understood, that we are not limited to the particular conditions nor to the specific products mentioned therein.

Example 1

100 parts of sodium sulfide of 60%, 150 parts of sulphur and 500 parts of methyl-cyclohexanol are heated at about 120° while stirring until the mass is wholly dissolved. Thereafter 100 parts of 3-(4'-hydroxyphenyl)-amino-carbazole of the probable formula:

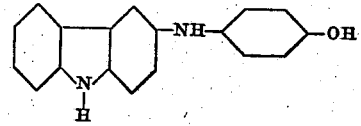

are introduced and the mixture is heated at first while using a cooling distilling tube until the water contained in the fusion mass is distilled off, then heating is continued while using a reflux condenser at about 150-160° for 2-3 hours, whereby the formed dyestuff slowly separates from the fusion mass. In order to isolate it the mass is poured on cold water and the cyclohexanol is distilled off by means of steam. Then the dyestuff is filtered off and in order to remove the excess of sulphur the precipitate is treated either in a moist state with a solution of sodium sulfide or when dry with a solvent as carbon disulfide. The dyestuff thus obtained generally shows the properties of the dyestuff prepared according to the U. S. Patent No. 956,348. But our product surpasses the said one by its great purity and coloring power as also by its ability to be easily vatted.

In the same manner one may proceed when starting from the indophenol prepared from nitrosophenol and ethylcarbazole. Furthermore the methyl-cyclohexanol may be replaced by similar compounds as for instance cyclohexanol itself or ac-tetrahydro-naphthol.

*Example 2*

46 parts of sodium sulfide of 60%, 37 parts of sulphur and 200 parts of cyclohexanol are heated at about 100° while stirring. Thereafter 12 parts of crystallized copper sulfate and 40 parts of the leuco-indophenol prepared from 1-para-tolyl-amino-napthhalene-8-sulfonic acid and para-amino-phenol and corresponding probably to the formula:

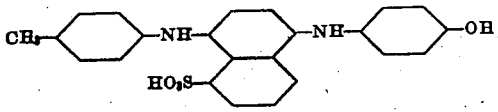

are introduced. The mixture is heated at about 165° for about one to two hours. Then the dyestuff is isolated as described in Example 1. It is identical with the product prepared according to the U. S. Patent No. 776,885 and is distinguished by an excellent purity and coloring power.

*Example 3*

200 parts of sodium sulfide of 60%, 250 parts of sulphur and 1500 parts of methyl-cyclohexanol are heated to 100–120°. Then 200 parts of 4-amino-3-methyl-4'-hydroxy-diphenyl-amine of the formula:

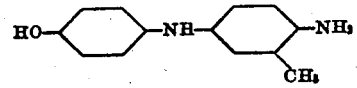

are introduced while stirring and the mixture is heated to 160–165° for about 2 hours. The mass is worked up as described in Example 1. The dyestuff thus produced is identical with the dyestuff prepared according to the U. S. Patent No. 709,151, surpassing it by a greater purity.

*Example 4*

46 parts of sodium sulfide of 60%, 61 parts of sulphur and 200 parts of methyl-cyclohexanol are heated for a short time to about 100°. Then 50 parts of 4-phenylamino-4'-hydroxy-diphenyl-amine of the formula:

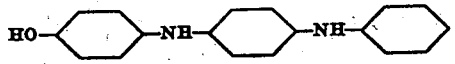

are introduced while stirring and the mass is heated to about 160° for 3 hours. Thereafter the mixture is diluted with cold water and the methyl-cyclohexanol is distilled off by means of steam. The dyestuff is separated by acidifying the distillation residue or by allowing air to pass through. The product is identical to but purer then the dyestuff prepared according to the U. S. Patent No. 723,154.

We wish it to be understood that in the following claims the term "indophenol compounds" includes the indophenols and their leuco-compounds.

We claim:

1. The process which comprises heating an indophenol compound with polysulfides in the presence of a hydroaromatic hydroxy-compound as a solvent.

2. The process which comprises heating an indophenol compound with polysulfides in the presence of a hydroaromatic hydroxy-compound of the cyclohexanol series as a solvent.

3. The process which comprises heating an indophenol compound with polysulfides in the presence of methyl-cyclohexanol as a solvent.

4. The process which comprises heating 3-(4'-hydroxy-phenyl)-amino-carbazole with polysulfides in the presence of a hydroaromatic hydroxy-compound of the cyclohexanol series as a solvent.

5. The process which comprises heating 3-(4'-hydroxy-phenyl)-amino-carbazole with polysulfides in the presence of methyl-cyclohexanol as a solvent.

In testimony whereof we affix our signatures.

GEORG KALISCHER.
HEINRICH RITTER.